United States Patent
Yazar et al.

(10) Patent No.: US 11,057,251 B1
(45) Date of Patent: Jul. 6, 2021

(54) OPTIMIZATION OF THE NUMBER OF NUMEROLOGIES AND NUMEROLOGY SELECTION METHOD IN FIFTH GENERATION CELLULAR COMMUNICATIONS SYSTEMS

(71) Applicant: Istanbul Medipol Universitesi, Istanbul (TR)

(72) Inventors: Ahmet Yazar, Istanbul (TR); Hüseyin Arslan, Istanbul (TR)

( * ) Notice: Subject to any disclaimer, the term of this patent is extended or adjusted under 35 U.S.C. 154(b) by 0 days.

(21) Appl. No.: 16/756,356

(22) PCT Filed: Nov. 30, 2018

(86) PCT No.: PCT/TR2018/050751
§ 371 (c)(1),
(2) Date: Apr. 15, 2020

(87) PCT Pub. No.: WO2019/132827
PCT Pub. Date: Jul. 4, 2019

(30) Foreign Application Priority Data

Dec. 26, 2017  (TR) .................................. 2017/21796

(51) Int. Cl.
*H04L 27/26* (2006.01)
*H04W 8/18* (2009.01)

(52) U.S. Cl.
CPC ....... *H04L 27/26025* (2021.01); *H04W 8/183* (2013.01)

(58) Field of Classification Search
CPC ............... H04L 5/0053; H04L 27/2602; H04L 27/26025; H04L 5/0092; H04L 5/0094; H04L 27/2605; H04W 8/183
See application file for complete search history.

(56) References Cited

U.S. PATENT DOCUMENTS

| | | | |
|---|---|---|---|
| 2018/0198648 A1* | 7/2018 | Sun | H04J 11/0073 |
| 2018/0310308 A1* | 10/2018 | Loehr | H04W 72/10 |
| 2019/0288898 A1* | 9/2019 | Ibrahim | H04B 17/336 |
| 2019/0357239 A1* | 11/2019 | Moon | H04L 5/0094 |
| 2020/0169375 A1* | 5/2020 | Yl | H04L 5/001 |
| 2020/0322925 A1* | 10/2020 | Takeda | H04L 27/2605 |
| 2020/0336249 A1* | 10/2020 | Yl | H04L 5/00 |

FOREIGN PATENT DOCUMENTS

| | | |
|---|---|---|
| WO | 2017213433 A1 | 12/2014 |
| WO | 2017209585 A1 | 12/2017 |

OTHER PUBLICATIONS

Huawei et al."Initial access in NR" 3GPP Draft; R2-163923 Initial access in NR, 20160514 3rd Generation Partnership Project (3GPP), Mobile Competence Centre; 650, route des Lucioles; F-06921 Sophia-Antipolis Cedex; FranceRAN WG2Nanjing, China; May 23, 2016-May 27, 2016; May 14, 2016.
International Search Report for corresponding PCT/TR2018/050751.
Written Opinion of the ISA for corresponding PCT/TR2018/050751.

* cited by examiner

*Primary Examiner* — Khanh C Tran

(57) ABSTRACT

According to the necessities of users under a service of one base station, the disclosed method decides how many instantaneous numerology structures should be used mostly and selects the most suitable numerologies from the existing numerology set.

1 Claim, 2 Drawing Sheets

Figure 1:
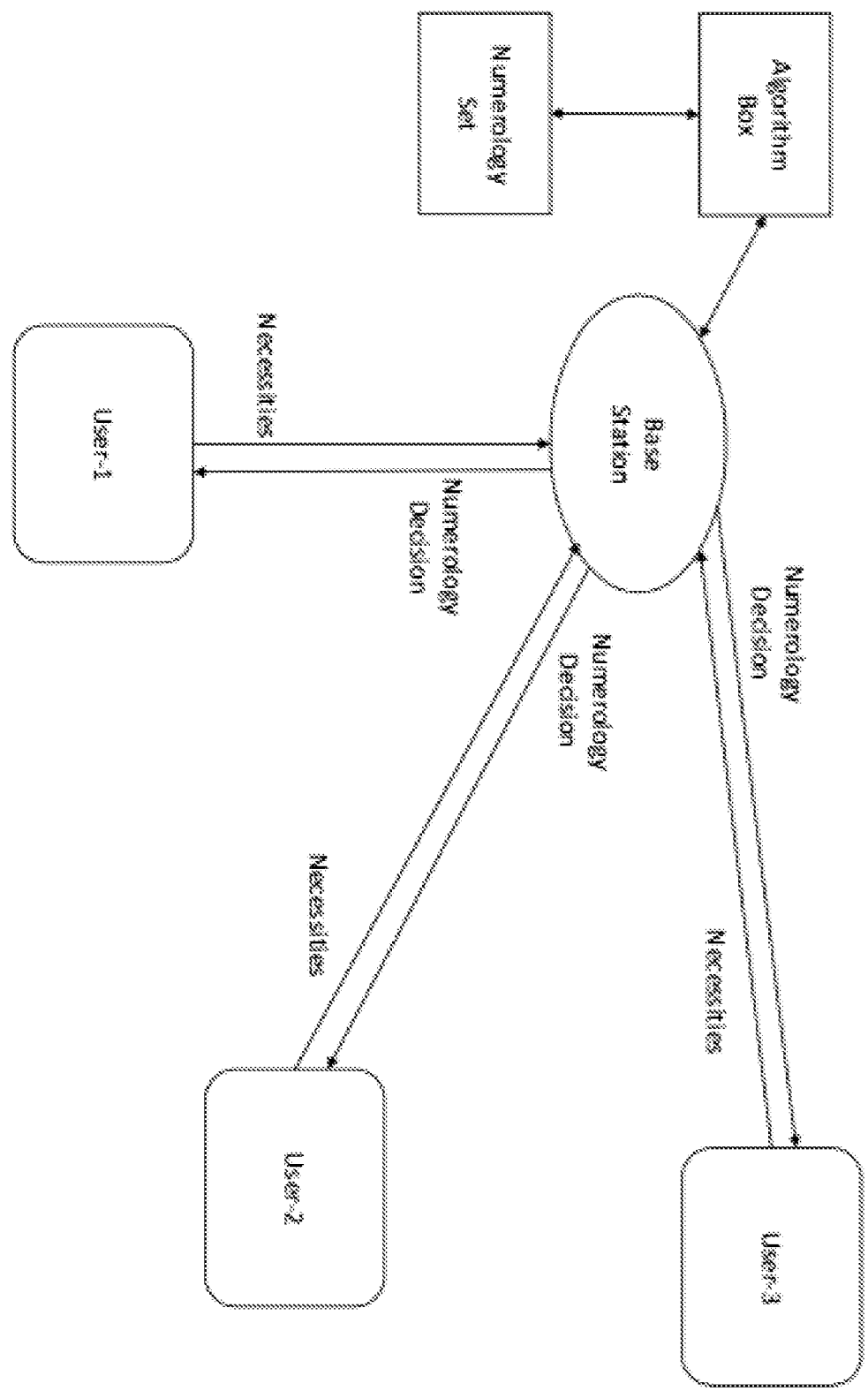

OPTIMIZATION OF THE NUMBER OF NUMEROLOGIES AND NUMEROLOGY SELECTION METHOD IN FIFTH GENERATION CELLULAR COMMUNICATIONS SYSTEMS

TECHNICAL FIELD

The invention relates to the method of selecting the most suitable numerologies from the existing numerology set by determining the number of different numerology structures instantaneously for the mixed numerology structures to be used between the base station and the sim card devices in the 5th Generation (5G) and beyond cellular communication systems.

THE STATE OF THE ART/KNOWN STATUS OF YOUR TECHNIQUE

There have been great developments in personal communication technologies in recent years. Some of these may be the increase in demand for applications that require high data rates such as Internet, television, real-time games, and the growing variety of applications that lead to different types of necessities, such as the increasing number of users recently. With the changing system and user requirements, in the last twenty-five years, 2nd Generation systems, 3rd Generation systems and 4th Generation systems were developed in terms of cellular communication systems and many products were arised with these systems.

For the 4th Generation (4G) and previous cellular communication systems, a single numerology (a set of parameters for the waveform) was used instantaneously for a single base station European Telecommunications Standards Institute (ETSI) The 3rd Generation Partnership Project (3GPP) continues the standardization of 5th Generation (5G) cellular communication systems and Cyclic Prefix Orthogonal Frequency Division Multiplexing (CP-OFDM) is preferred like in 4G cellular communication systems. But instead of a single numerology, it is desirable to use more than one numerology simultaneously (mixed numerologies) for a base station with 5G.

Thus, by increasing the flexibility of the system, it is aimed to meet the necessities of users (sim card insertable devices) more.

The very high diversity of applications that comes with 5G has greatly increased the range of users that a base station serves. The most important need for cellular communication systems before 5G was high data capacity and high data rate but different necessities have come into prominence for different users with 5G.

Although users may have different necessities, it is foreseen that for 5G, there will often be no need to use as many numerology structures as possible within the existing set of numerologies. When using more numerology structures, the spectrum needs of the system are increased and spectral efficiency decreases. Because it is necessary to separate guard bands to prevent interference between different numerology structures.

In a situation where a single numerology structure is used, the system can serve without extra interference. In other words, the combination of fewer numerologies reduces the loss of spectral efficiency. However, in this case, the flexibility of the system cannot be achieved at the desired level. Apart from the spectral efficiency metric, as the number of numerology structures used simultaneously by a base station increases, the signaling overhead and scheduling complexity on the cellular communication network to which this base station is connected can also increase. As can be seen, many different performance metrics should be considered.

With the invention, the disadvantages that come during the increase in flexibility by the number of numerology structures can be eliminated.

Technical Problems for Solution of the Problem

In the present techniques, the algorithms for determining the number of numerology structures needed are not developed yet when using mixed numerology structures between the base station and the sim card insertable devices which can be installed in the coverage area of this base station. According to the necessities of the users of a base station with the method in the invention, it is decided to select the most suitable numerologies from the existing numerology set on the cellular communication network by determining how many numerology structures should be used instantaneously.

The structural and characteristic features and all the advantages of the invention will be understood more clearly by the following figures and the detailed description, therefore the evaluation should be made in view of these figures and the detailed description.

DESCRIPTION OF PICTURES

Figure 2:
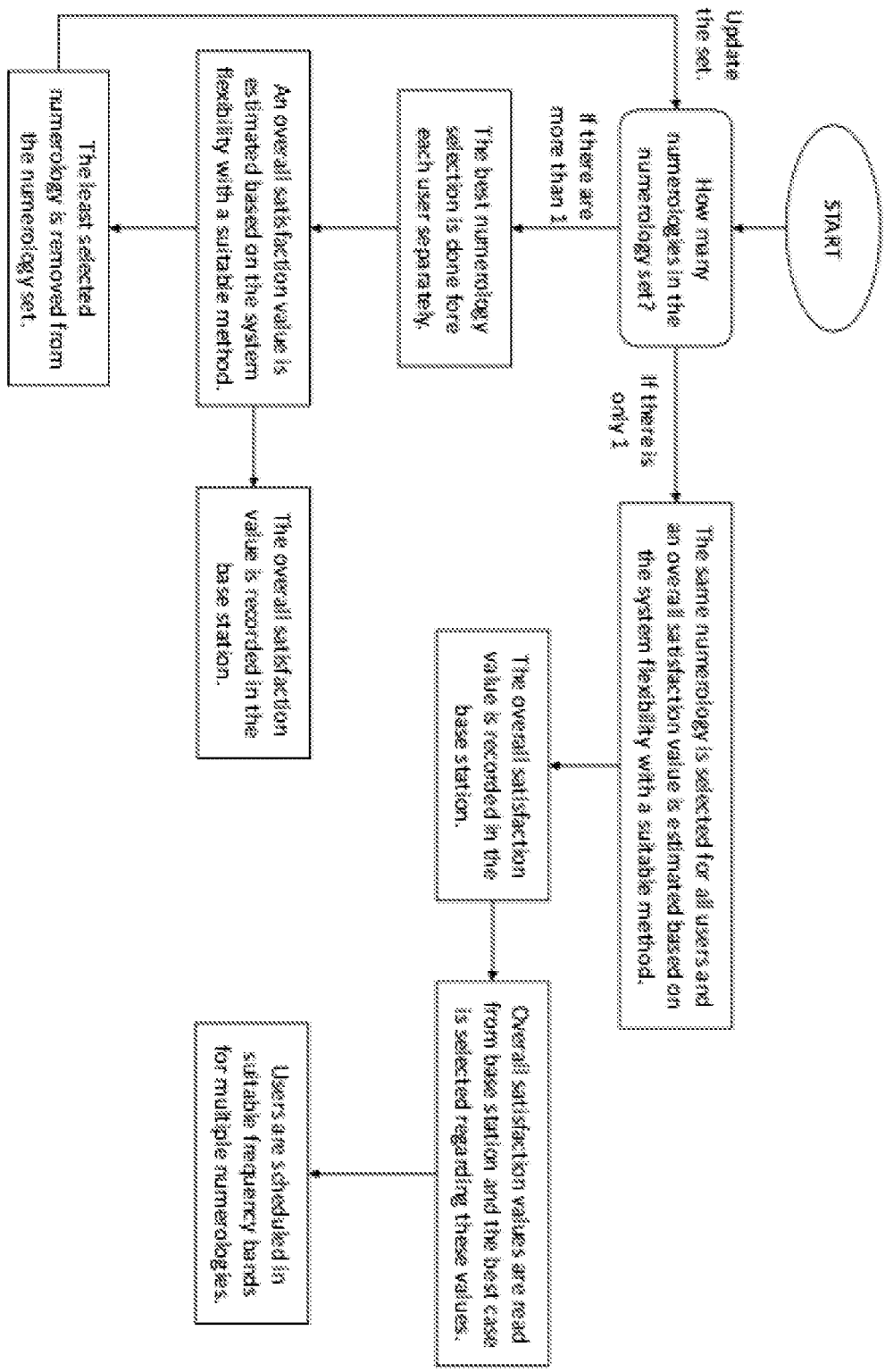

FIG. 1: General schematic representation describing the operation of the method of the invention FIG. 2: Flow diagram of the algorithm used in the method according to the invention

DESCRIPTION/DISCLOSURE OF THE INVENTION

The invention decides on the number of different numerology structures that can be instantaneously used and selects the most suitable numerologies for each user from the existing numerology set between a base station and users under the service of this base station for 5G and beyond cellular communication systems. The invention consists of two parts. In the first part, the flexibility of the system is calculated in a novel way as a new metric. In the second part, by using the flexibility metric, there is a novel operation which will give the optimum result for the number of numerologies from the existing numerology set.

The flexibility value (F) for the instantaneous service given by a base station, which constitutes the first part of the method of the invention, is calculated by following equation.

$$F = \sum_u \frac{S_u}{U}$$

In this equation, $S_u$ expression gives the value of satisfaction for user u. The higher the value of satisfaction, the more the user's necessities are met. U used in the equation refers to the total number of users the base station currently serves. F is calculated by summing and averaging the values of satisfaction of each user.

The calculation of $S_u$ values for each user is done by using the following equation.

$$S_u = \sum_k \frac{P_k}{K}$$

$P_k$ values in this equation indicate the user satisfaction with each necessity (k) used as an input to the algorithm. There are totally K necessities that are used as inputs for the algorithm. Each $S_u$ value is calculated as the average of user satisfactions that are belong to algorithm inputs.

The following equation is used for the $P_k$ values calculated for each necessity of each user.

$$P_k = \begin{cases} 1, & I_{l,k} = N_{u,k} \\ 0, & D_k + 1 \geq M \\ 1 - \dfrac{D_k + 1}{M}, & D_k R_k \leq A_k \leq (D_k + 1)R_k \end{cases}$$

In this equation, $N_{u,k}$ refers to the numerology parameter, which can be selected under ideal conditions for the k necessity of u user. $I_{l,k}$ is the corresponding parameter for the k necessity, where the l'th numerology in the current numerology set is selected. If the number of defined numerologies are same with the number of users in a numerology set, then all $P_k$ values would be 1 and ideal user satisfaction could be achieved.

The $A_k$ and $D_k$ values shown in the above equation are calculated using the following equations.

$$A_k = |I_{l,k} - N_{u,k}|$$

$$D_k = \dfrac{A_k}{R_k} - \left[\dfrac{A_k}{R_k} (\text{mod}(1))\right]$$

$A_k$ gives the distance between an ideal parameter for the k necessity and the currently selected numerology parameter. $R_k$ is a reference value determined for the k necessity. $D_k$ is calculated by normalizing the $A_k$ value according to $R_k$ value. The M value determines the resolution of the algorithm. In the algorithm, there can be M+1 different $P_k$ values. As the value of M increases, the resolution of the user satisfaction algorithm increases, but this also increases the computational complexity.

In the second part of the method according to the invention, in addition to the flexibility of the system, it is ensured that the general satisfaction of the system is included in the algorithm to determine how many numerology structures are needed instantaneously.

The $I_l^*$ value represents the best numerology to be selected for a user from the existing numerology set. In this context, using the following equation, the best numerology selection is made from the numerology set for each user.

$$I_l^* = \underset{I_l}{\text{argmax}} S_u$$

The most suitable numerology is selected for each user and then the number of selections of each numerology is counted. Then, the least preferred numerology is removed from the numerology set for that moment, and for those who prefer this numerology structure, a new numerology selection is made by applying the equation above. This cycle is continued until a single numerology remains in the numerology set and the final satisfaction (V) is calculated using the following formula in each step. At the end of the algorithm, the number of final satisfaction values are equal with the number of numerologies in the numerology set. The maximum satisfaction value is taken as a reference to decide on the number of numerologies used in the algorithm.

$$V = \dfrac{B_U}{B_U + B_G} \times F$$

In the above equation, the value of Bu gives the sum of the bandwidths that users need in the coverage of the base station. The BG value shows the sum of the protection bands that should be left to prevent interference between different numerology structures. As the number of mixed numerology structures increases, the BG value increases and therefore the spectral efficiency decreases. The decrease in spectral efficiency negatively affects the overall satisfaction of the system.

The process steps of the workflow for the invention are as follows:
- The number of numerologies in a numerology set is checked by the base station,
- If there is more than one numerology in the numerology set, the most suitable numerology selections are made for all of the users who are serving from the base station according to the necessities of the users,
- After the selection of numerologies, the general satisfaction value of the system based on the flexibility of the system is calculated in a suitable method and recorded in the base station for the service given by the base station instantaneously,
- The least preferred numerology after the numerology selection process is removed from the numerology set by the base station and the algorithm cycle returns to the beginning,
- Each time the algorithm cycle is repeated, one numerology will be removed from the set, and when there is only one numerology remained in the numerology set, the general satisfaction value of the system based on the flexibility of the system according to the situation all users prefer one numerology is calculated in a suitable method and recorded in the base station for the service given by the base station instantaneously,
- By comparing the overall system satisfaction values at the base station, the number of numerologies is decided according to the highest satisfaction value corresponding this number of numerologies.
- The base station determines the numerologies of all users for the highest satisfaction value case.
- For mixed numerologies, users are located in the appropriate frequency bands of different numerologies by the base station.

The base station serves the users in its coverage area by adjusting the bandwidths of each numerology structure according to the numerology structures decided to be used instantaneously. With this invention, selection of the most suitable numerology for each user can be made by the base station without using all of the numerologies in the numerology set.

It is evident that one competent person can also introduce the novelty set forth in the invention using similar embodiments, and/or apply this embodiment to other similar purposes as used in the art. Thus, it is evident that such embodiments will be devoid of the criterion of innovation and in particular of exceeding the known state of the art.

INDUSTRIAL APPLICABILITY/APPLICATION OF INVENTION TO INDUSTRIALIZATION

When designing and manufacturing 5G base stations, the method of the invention may need to be implemented in these base stations. In addition to the base stations, the method according to the invention can be utilized during the design and production of various modules in order to transmit the required user necessities to the base station in the respective electronic units of the different sim card insertable devices which can use the cellular communication infrastructure. In this context, the method according to the invention will be useful in terms of base stations, mobile phones and other sim car insertable user equipment in the 5G infrastructure.

The invention claimed is:

1. A method of selecting the most suitable numerologies from an existing numerology set by determining the number of different numerology structures instantaneously by also considering the important performance criteria for the mixed numerology structures to be used between a base station and sim card devices in 5th Generation (5G) and beyond cellular communication systems, and it characterized in that it comprises the following process steps for the operation of the method:

the number of numerologies in a numerology set is checked by the base station;

if there is more than one numerology in the numerology set, the most suitable numerology selections are made for all of the users who are serving from the base station according to the necessities of the users;

after the selection of numerologies, the general satisfaction value of the system based on the flexibility of the system is calculated in a suitable method and recorded in the base station for the service given by the base station instantaneously;

the least preferred numerology after the numerology selection process is removed from the numerology set by the base station and an algorithm cycle returns to the beginning;

each time the algorithm cycle is repeated, one numerology will be removed from the set, and when there is only one numerology remained in the numerology set, the general satisfaction value of the system based on the flexibility of the system according to the situation all users prefer one numerology is calculated in a suitable method and recorded in the base station for the service given by the base station instantaneously;

by comparing the overall system satisfaction values at the base station, the number of numerologies is decided according to the highest satisfaction value corresponding this number of numerologies;

the base station determines the numerologies of all users for the highest satisfaction value case; and for mixed numerologies, users are located in the appropriate frequency bands of different numerologies by the base station.

* * * * *